United States Patent [19]

Sempolinski

[11] Patent Number: 5,118,552
[45] Date of Patent: Jun. 2, 1992

[54] COMPOSITE ARTICLE AND METHOD

[75] Inventor: Daniel R. Sempolinski, Painted Post, N.Y.

[73] Assignee: Corning Incorporated, Corning, N.Y.

[21] Appl. No.: 664,217

[22] Filed: Mar. 4, 1991

[51] Int. Cl.⁵ .............................. B32B 5/00; B32B 7/00
[52] U.S. Cl. ...................................... 428/98; 428/116; 428/118; 428/119; 428/325; 65/18.1; 65/18.3; 65/43; 501/4; 501/7; 501/8; 501/17; 501/18; 501/32; 501/69
[58] Field of Search ............... 428/98, 116, 118, 119, 428/325; 65/18.1, 18.3, 43; 501/8, 17, 18, 32, 7.4, 69

[56] References Cited

U.S. PATENT DOCUMENTS

| | | | |
|---|---|---|---|
| 2,326,059 | 8/1943 | Nordberg | 501/94 |
| 3,778,242 | 12/1973 | Francel | 501/7 |
| 3,839,001 | 10/1974 | Adams | 501/17 |
| 4,315,991 | 2/1982 | Hagy | 501/69 |
| 4,547,467 | 10/1985 | Barth | 501/17 |
| 4,755,490 | 7/1988 | Dilazzaro | 501/17 |
| 4,849,380 | 7/1989 | Sawhill | 501/17 |
| 4,883,705 | 11/1989 | Kawakami | 501/32 |
| 4,917,934 | 4/1990 | Sempolinski | 428/116 |

FOREIGN PATENT DOCUMENTS 56116  5/1977  Japan ....................................... 501/18

Primary Examiner—Ellis P. Robinson
Assistant Examiner—Nasser Ahmad
Attorney, Agent, or Firm—Milton M. Peterson; Clinton S. Janes, Jr.

[57] ABSTRACT

A composite article, such as a telescope mirror blank, comprising a solid glass body and a supporting network structure, the structure being composed of a network of interlocking struts frit sealed to one another and to the face plate. The article is characterized in that sufficient of the glass body is incorporated in particulate form in the struts to maintain an average expansion mismatch ($-50°$ C. to $+50°$ C.) between the network structure and the glass body of no more than 0.15 ppm/°C.

28 Claims, 2 Drawing Sheets

COMPOSITE ARTICLE AND METHOD

FIELD OF THE INVENTION

The field of the invention is a composite article, such as a telescope mirror blank, that comprises a solid glass body adhered to a supporting network structure produced by ceramic powder technology from a sinterable, crystallizable glass frit.

BACKGROUND OF THE INVENTION

The invention relates to composite articles wherein a solid glass body is adhered to a supporting network structure or core. The adherence may be through the medium of a fused glass sealing frit.

The invention arose from problems encountered in producing a telescope mirror blank of the type described in my U.S. Pat. No. 4,917,934. The invention finds particular application in production of such an article, and, therefore, is primarily described with reference thereto. However, it will be readily apparent that it is equally applicable to composite articles in general that have similar characteristics and problems.

Telescope mirror blanks are commonly produced from materials having very low coefficients of thermal expansion (CTEs), particularly over the temperature range of $-50°$ to $100°$ C. This minimizes the effect of temperature changes in the ambient atmosphere on measurements made with a telescope.

Materials presently used include both fused silicas and glass-ceramics having CTE values in the range of $\pm 10 \times 10^{-7}/°C$. over the $0°$-$300°$ C. range. The fused silicas are an essentially pure silica and a silica doped with about 7.5% $TiO_2$. The latter is described in detail in U.S. Pat. No. 2,326,059 (Nordberg), and is hereafter identified as a $TiO_2$-doped, fused silica glass.

The advent of larger diameter, and hence much heavier, mirror blanks led to producing the face plate and the network core components separately. Subsequently, these components are united, for example, by use of a sealing frit.

My U.S. Pat. No. 4,917,934 describes producing a network core as a separate body. The core is then united with the face and back plates by frit sealing. The network core is assembled from a plurality of sintered struts. The struts are formed from a thermally crystallizable glass by ceramic powder technology and then sintered. The sintered struts are sealed to one another, and to the plates, with a sealing glass frit. Preferably, the same thermally crystallizable glass frit is used for both sealing and for production of the struts.

The thermally crystallizable glasses recommended for forming the network core are described in U.S. Pat. No. 4,315,991 (Hagy et al.). The glasses disclosed there are compatible with materials having coefficients of thermal expansion (CTEs) in the range of $-5$ to $+5 \times 10^{-7}/°C$. ($0°$-$300°$ C.). The glasses sinter and crystallize in the temperature range of $900°$-$1000°$ C.

As expressed in weight percent on an oxide basis, these glasses consist essentially of 1-2% $Li_2O$, 0.7-1.5% $MgO$, 9-13% $ZnO$, 19-23% $Al_2O_3$, 62-68% $SiO_2$, and at least 1% $K_2O+Rb_2O+Cs_2O$ in the indicated proportions of 0-3% $K_2O$, 0-4% $Rb_2O$ and 0-6% $Cs_2O$. The heavy alkali metal oxides inhibit crystallization, and thus facilitate sintering. The primary crystal phase developed during crystallization is zinc beta-quartz.

A production glass was selected to provide as small an expansion mismatch with the face plate as possible in the vicinity of ambient temperature ($-50°$ to $+50°$ C.). At the same time, a reasonably close match had to be maintained at higher temperatures as well. An ambient temperature average mismatch as low as about 0.30 ppm/°C. could be obtained by carefully tailoring the glass composition. This proved satisfactory for frit sealing, but would not suffice for strut production. For that purpose, modeling studies showed that a value not over 0.15 ppm/°C., and preferably not over 0.10 ppm/°C., would be required.

PURPOSES OF THE INVENTION

A basic purpose is to provide a supporting network structure for a composite article that has an improved ambient temperature expansion match with a solid glass body to which the network structure is adhered.

A further purpose is to provide an improvement in the material for a network core structure of the type described in my prior U.S. Pat. No. 4,917,934.

A still further purpose is to provide a composite article comprising a supporting network and a solid glass body wherein the supporting network and the glass body have an expansion mismatch not over about 0.15ppm/°C. in the vicinity of ambient temperature.

Another purpose is to provide an improved telescope mirror blank wherein the network core and the mirror faceplate of the blank have an average expansion mismatch not over about 0.15 ppm/°C. in the vicinity of ambient temperature.

SUMMARY OF THE INVENTION

The article of my invention is a composite article comprising a solid glass body and a supporting network structure, the network structure being a plurality of struts composed of a sintered and crystallized glass powder and being frit sealed to one another and to the glass body, characterized in that a glass filler in particulate form is dispersed within the sintered struts to provide an average expansion mismatch between the struts and the glass body that does not exceed about 0.15 ppm/°C. over the temperature range of $-50°$ to $+50°$ C. Preferably, the mismatch is not over 0.10 ppm/°C. The crystallizable glass may be composed of 1-2% $Li_2O$, 0.7-1.5% $MgO$, 9-13% $ZnO$, 19-23% $Al_2O_3$, 62-68% $SiO_2$ and at least 1% of $K_2O+Rb_2O+Cs_2O$ in proportions of 0-3% $K_2O$, 0-4% $Rb_2O$ and 0-6% $Cs_2O$ and serves as a matrix for fine particles of the glass body material as a filler. The filler may constitute about 10-22 weight percent of the glass mixture in the case of a $TiO_2$-doped, fused silica glass body and 4-8 weight percent in the case of a pure fused silica glass body. A preferred embodiment of the composite article is a telescope mirror blank composed of glass face and back plates and a supporting network core.

The invention further contemplates a method of producing a composite article comprising a solid glass body and a supporting network structure, the network structure being composed of a plurality of struts composed of sinterable and crystallizable glass powder and being frit sealed to one another and to the glass body, characterized by forming the struts from a slurry of sinterable, thermally crystallizable glass powder containing dispersed therein particles of the glass body in an amount sufficient to provide an average expansion mismatch between the network core and the glass body that is not greater than about 0.15 ppm/°C. over the temperature range of −50° to 50° C. The method finds particular application in production of a telescope mirror blank.

BRIEF DESCRIPTION OF THE DRAWINGS

In the accompanying drawings.

PRIOR ART

Applicant is unaware of any prior art more relevant than the two U.S. Patents already mentioned and the references cited therein. The two patents are incorporated herein by reference.

It may be noted that the concept of seeding, or adding dopants to, glasses to control crystallization or other properties, is known in the art. For example, U.S. Pat. No. 3,778,242 (Francel et al.) discloses lead-zinc-borate sealing glasses mixed with a refractory oxide, such as beta-eucryptite, and a minute amount of a precrystallized lead-zinc-borate glass. The materials involved, of course are distinctly different from those of the present invention.

DESCRIPTION OF THE INVENTION

Figure 1:
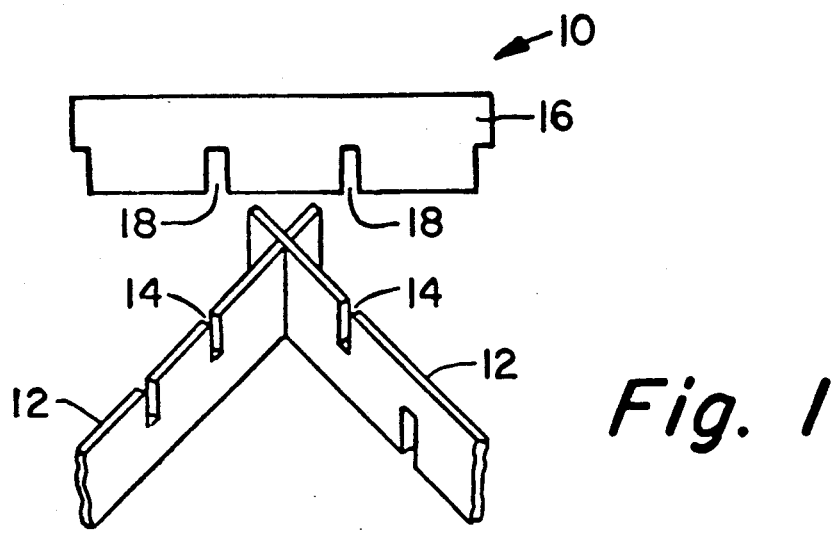
FIG. 1 is an exploded, fragmentary view of a partial network structure in accordance with the invention.

In the accompanying drawing, FIG. 1 is an exploded view of a partial network structure 10. Structure 10 includes two interlocking struts 12 having slots 14 adapted to receive a cross strut 16 having slots 18.

Figure 2:
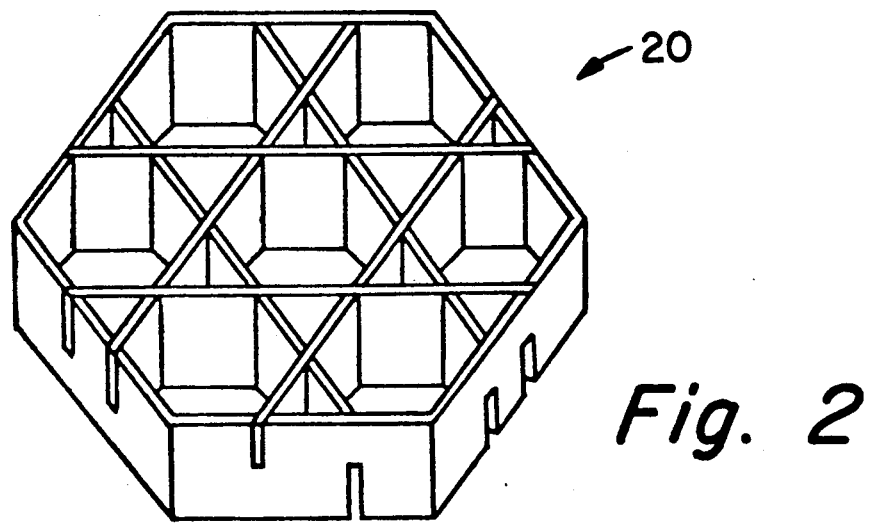
FIG. 2 is a perspective view of a network core for a telescope mirror blank.

Assembly of a plurality of struts, such as 12 and 16, in an interlocking structure, and their joinder with a sintered sealing frit, results in a network core 20 such as shown in the perspective view of FIG. 2.

Figure 3:
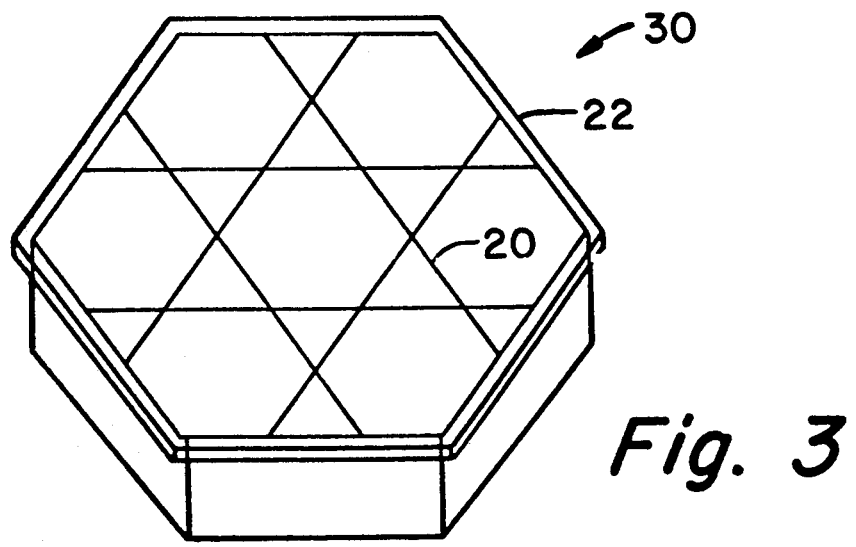
FIG. 3 is a perspective view of the network core of FIG. 2 with a face plate attached.

FIG. 3 is a perspective view of core 20 with a face plate 22 attached thereto to provide a mirror blank 30.

As described in the '934 patent, struts 12 and 16 may be produced from a glass powder by tape casting. This involves mixing a finely divided glass or ceramic material with a volatile liquid medium to form a slurry. The slurry is then applied in a thin layer on a belt or similar support (the tape) and dried to form a releasable sheet.

The glass, from which the slurry is formed, may be a low expansion, sinterable glass capable of being crystallized in situ to a glass-ceramic state. As explained in the '934 patent, glasses disclosed in the Hagy et al. '991 patent are particularly well suited to the purpose. These glasses, when crystallized, have a primary crystal phase of zinc beta-quartz crystals. Chemically, they consist essentially, in weight percent on an oxide basis, of 1-2% $Li_2O$, 0.7-1.5% MgO, 9-13% ZnO, 19-23% $Al_2O_3$, 62-68% $SiO_2$ and at least 1% of one or more of $K_2O$, $Rb_2O$, and $Cs_2O$ in the indicated proportions of 0-3% $K_2O$, 0-4% $Rb_2O$ and 0-6% $Cs_2O$.

The glasses are pulverized and the powder suspended in a mixture of volatile organics. The resulting slurry is spread out in a thin layer and dried to form a "green" sheet. The sheet is then cut into strips of appropriate size to form struts 12. The strips are then fired to sinter and crystallize the glass. After machining slots in the sintered strips, the latter are assembled as shown in FIG. 1 with frit seal supplied at the contacting surfaces of the slots.

The present invention arose from an attempt to practice the invention of the '934 patent. This involved forming struts for a network core from the zinc aluminosilicate glass prescribed in the patent. The struts were assembled and the resulting core frit sealed to a mirror face plate composed of the $TiO_2$-doped, fused silica glass.

The ambient temperature expansion mismatch observed between the crystallized glass struts and the mirror face plate was about 0.28 ppm/°C. As used herein, "ambient temperature expansion mismatch" is the average coefficient of thermal expansion (CTE) over the range of −50° C. to +50° C. The 0.28 ppm/°C. value had proven satisfactory for forming a frit seal, since the seal involved only a thin layer. However, it was found inadequate for strut production where larger dimensions were involved. Rather, it was determined that the mismatch must not exceed about 0.15 ppm/°C., and preferably not over 0.10 ppm/°C., for strut production.

At the same time, the absolute temperature mismatch, that is the total mismatch that occurs as the frit seal is formed and then cooled, must not be allowed to become so great as to result in breakage. The degree of absolute mismatch that may be tolerated will vary depending on article size and sealing conditions. In one given situation, a tolerance of +25 ppm and −75 ppm is permitted for example. The problem then was to reduce the ambient temperature CTE mismatch without increasing the absolute mismatch during sealing.

Initially, attempts were made to slightly alter the frit composition. In particular, the $SiO_2$ level was increased in one percent increments to enhance a glassy phase in the frit after crystallization. Also, MgO was increased, but only by tenths of one percent, since the glass frit was known to be sensitive to changes in this ingredient.

It was found that ambient temperature mismatch could be improved. However, by the time the mismatch became marginally acceptable, the sintered samples started to fracture, either during the firing cycle or after cooling. This indicated too great an absolute mismatch.

At this point, thinking turned to a glass/glass-ceramic composite wherein prior to firing, the frit glass is mixed with a low expansion glass that is inert during the firing cycle. It was found that, even at temperatures in the range of 900°-1000° C., pulverized mirror glass remained essentially inert to the frit glass. Accordingly, it could be used as a filler providing the mixture could be successfully sintered and crystallized to a dense, essentially non-porous body.

Composite mixtures of the mirror glass and frit were prepared over a wide binary mixture range. These mixtures were milled to an average particle size of 9-10 microns and bodies prepared for sintering.

Measurements made on the sintered bodies revealed that the large ambient temperature CTE value gradually decreased as the amount of glass filler was increased. In this application, mixture compositions are expressed in percent by weight. The value of the mirror glass filler added may be increased by about 10-12% if equivalent volume percentage compositions are desired.

When the amount of mirror glass additive reached about 10% by weight, the ambient temperature mismatch became marginally acceptable. Surprisingly, the absolute mismatch also decreased with increasing amounts of filler. Absolute values and limits are somewhat dependent on sintering and sealing temperatures and conditions. However, above about 18% filler, the sintered bodies began to show porosity and underwent a considerable loss of strength. Thus, while mixtures containing 10-22% by weight mirror glass filler are considered acceptable, a range of 12-18% is preferred. The optimum amount of filler appears to increase with the maximum temperature of the sintering and crystallizing cycle. In general, a sintering cycle is selected within the range of about four hours at 925° C. to about one hour at 975° C. I prefer a cycle of about two hours at 950° C. with a filler content of 16%.

In preparing mixtures, either for sealing or for tape casting struts, the material mixtures were milled to average particle sizes on the order of ten microns. Both jet milling (fluid energy milling), and vibramilling with fused silica media, were employed. No appreciable contamination occurred with the former, but a pick-up of silica was noted with the latter.

Since vibramilling was preferred, it became necessary to determine the effect of the silica contamination. A comparative firing study was therefore made using pairs of mixtures in which the only variable was the type of mill used in pulverizing the mixtures. The vibramilled materials contained about 2.6% by weight silica powder from the grinding media.

Surprisingly, it was found that the silica addition was advantageous. The mechanical strength of a sintered body containing silica powder was 25% greater than the same body prepared by jet milling. Also, the expansion properties of the sintered bodies were less sensitive to firing conditions. Both effects are beneficial in mirror fabrication.

In view of the success in fabricating a network structure for a $TiO_2$-doped, fused silica mirror, the study was extended to the pure fused silica analogue. In preparing struts for a network core for a pure fused silica mirror, as well as for sealing, an essentially identical frit glass is used. The essential difference is an increase in MgO content from 0.8 wt % to 1.1 wt. %.

Initially, attempts were made to add a silica filler to the milled frit glass. This had little effect on expansion characteristics, but decreased mechanical strength of a sintered body. The situation was quite different when the silica was introduced during grinding. Silica added in this manner reduced the room temperature mismatch without serious effect on strength. However, the absolute mismatch is increased in a negative direction, thereby limiting use to about 8% by weight. The optimum loading level is 5.5 to 7.0% by weight. However, the material is quite sensitive to firing conditions so that it is preferable to fire a 7% mixture at 975° C.

In summary, I have discovered that the room temperature mismatch between a fused silica glass body, such as a telescope mirror faceplate, and a supporting network structure formed of low expansion, crystallized glass struts can be brought within acceptable limits below about 0.15 ppm/°C. without unduly affecting the absolute mismatch. This involves forming the slurry used in strut formation from a pulverized mixture of frit glass and the fused silica glass of the face plate mirror. The mixture may be on the order of ten microns average particle size.

The amount of fused silica glass filler in the mixture depends on the particular fused silica used in the glass body. Thus, with the $TiO_2$-doped, fused silica glass, a range of 10-22% is acceptable, but 12-18% is preferred. In the case of a pure fused silica body, the amount of filler is preferably 5.5-7% by weight.

SPECIFIC EXAMPLES

The invention is further described with reference to certain specific experiments conducted in the course of developing the invention. In these experiments, a frit glass was used having the following composition in percent by weight on an oxide basis: 63.0% $SiO_2$, 20.5% $Al_2O_3$, 10.3% ZnO, 1.5% $Li_2O$, 3.9% $Cs_2O$ and 0.8% MgO.

As noted earlier, attempts to make slight alterations in the frit glass composition were not successful. Accordingly, attention was directed to composite bodies produced from a mixture of a low expansion glass with the frit glass as an additive or filler. For this purpose, the frit glass was pulverized by vibramilling with fused quartz media. The average particle size was about 3.7 microns with 80% being between one and eleven microns.

The $TiO_2$-doped, fused silica glass used for seeding was pulverized by jet milling. The average particle size was 6.0 microns with 80% being between 1.7 and 10.6 microns.

The glass powders were thoroughly mixed in ten different proportions. Each mixture was pressed to form bodies for sintering. Each sample was sintered by holding at a temperature of 950° C. for two hours.

TABLE 1, below, shows data measured on the sintered samples "Filler" indicates the weight percent of the $TiO_2$-doped, fused silica filler present in the glass mixture for each sample. Actual density (Dens.) is shown in grams/cc. The theoretical density of the frit glass alone is 2.56; that for the glass filler is about 2.20. Expansion data are given as "CTE" (the average mismatch/°C. between −50° and +50° C.) and "Abs." (absolute mismatch from frit sealing at 780° C.). Expansion data were measured on a sandwich seal with the center member being the standard face plate glass between pressed discs of the frit mixture.

TABLE 1

| FILLER (wt. %) | DENS gms/cc | MISMATCH | | MOR (psi) |
|---|---|---|---|---|
| | | Abs. (ppm) | CTE (ppm/°C.) | |
| 0 | 2.55 | −62 | −0.24 | 14,500 |
| 4.0 | 2.56 | — | — | 8,520 |
| 10.0 | 2.53 | −50 | −0.16 | 8,300 |
| 13.0 | 2.49 | −34 | −0.06 | 8,730 |
| 15.0 | 2.49 | −29 | −0.05 | 6,970 |
| 17.8 | 2.46 | −25 | +0.03 | 8,050 |
| 30.0 | 2.17 | −17 | +0.13 | 4,700 |

The samples with up to about 18% fill level sintered well. At higher levels the sintered bodies began to develop residual open porosity, and mechanical strengths fell below that of the face plate material. Mechanical strength decreased as fill level increased. Fill levels between 12% and 18% produced excellent expansion matches with the parent $TiO_2$-doped, fused silica, face plate glass. The optimum level for room temperature operation is about 16%.

Figure 4:
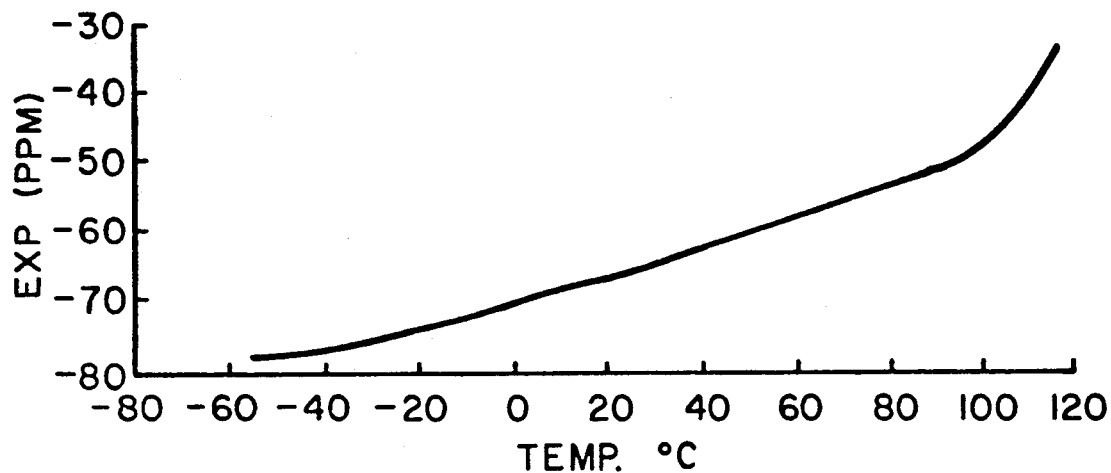
FIGS. 4 and 5 are graphical representations showing expansion mismatch plotted against temperature, and illustrating an advantage accruing from the present invention.
Figure 5:
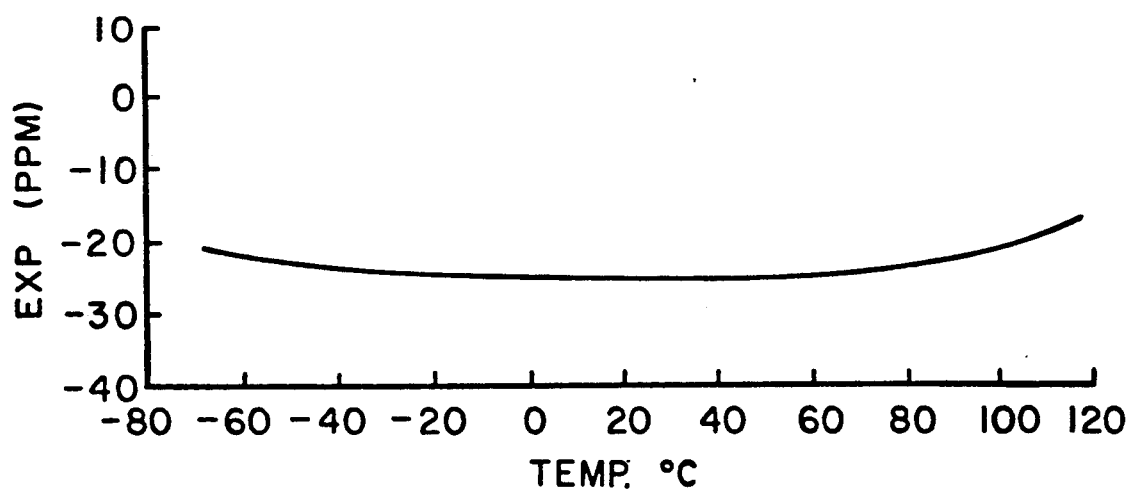

The improvement in mismatch may be seen by comparing the curves in FIGS. 4 and 5. In both FIGURES, temperature is plotted in °C. on the horizontal axis and expansion mismatch is plotted in parts/million (ppm) on the vertical axis. FIG. 4 is a plot of data measured on a seal between $TiO_2$-doped, fused silica glass and the zinc aluminosilicate frit glass with no additive. FIG. 5 is a plot of corresponding data for a seal between the $TiO_2$- doped, fused silica glass and the frit glass with a 17.8% by weight fill level of additive.

The effect of SiO2 pickup from vibramilling was determined by experiments comparing vibramilled and jet milled materials. In each set of samples, a 15 wt% addition of pulverized fused silica glass was made to the frit glass. In order to simulate actual firing conditions in production, pressed discs of the mixtures were fired for 15 minutes at the temperatures indicated in TABLE II below. Then a sandwich was made with a flat piece of fused silica glass between two processed discs of the pulverized mixture. Each sandwich was frit sealed by firing for 0.75 to 3.75 hours to provide overall firing times of 1 to 4 hours.

The observed data are summarized in TABLES II (a) and II (b). The former represents jet milled (no SiO2) materials; the latter, vibramilled (2.6 wt% SiO2) materials. Sintering conditions are shown under temperature (Temp.) and Time; mismatch is shown in terms of absolute (Abs.) and ambient average coefficient of thermal expansion (CTE) over the range of −50° C. to +50° C.; and mechanical strength, in terms of psi, as MOR.

TABLE II

| Sintering | | Mismatch | | |
|---|---|---|---|---|
| Temp. | Time | Abs. | CTE | MOR |
| 975° C. | 4 hrs. | −68 ppm | 0.053 ppm/°C. | 7630 |
| 975 | 1 | −27 | 0.263 | 7940 |
| 950 | 2 | +27 | 0.242 | 8370 |
| 925 | 4 | +10 | 0.196 | 8560 |
| 925 | 1 | −72 | 0.184 | 8100 |
| 975 | 4 | −31 | 0.037 | 10400 |
| 975 | 1 | −18 | 0.098 | 9500 |
| 950 | 2 | −23 | 0.115 | 8700 |
| 925 | 4 | −15 | 0.043 | 10100 |
| 925 | 1 | −12 | 0.145 | 8160 |

The data in TABLE II demonstrate the dual advantage of added SiO2 in the frit glass mixture. In addition to reducing the mismatch, it also significantly improves mechanical strength by about 25%.

Initial experiments with pure fused silica were made by directly adding powdered silica to pulverized frit glass. This approach proved unsuccessful. Not only was there little effect on expansion characteristics, but mechanical strength was significantly reduced.

When the silica was added by grinding, as in the earlier work with the TiO2-doped, fused silica glass, the results were very different. This is shown in TABLE III where table headings correspond to TABLE II. The data in TABLE III compare (1) no SiO2 addition, (2) addition as a powder, and (3) addition by grinding. The amount of silica introduced through grinding was controlled by mixing vibramilled and jet milled powders in the proper proportions. As indicated earlier, the frit glass used with pure fused silica is essentially identical with that used for the TiO2-doped analogue, except that the MgO level is about 1.1%, rather than 0.8%.

Test samples were prepared from a slurry of the powder mixture in the usual manner. The samples were double fired as described above, that is, 15 minutes at 950° C., cool, then 105 minutes at 950° C. for a total sintering time of 2 hours.

TABLE III

| | Mismatch | | |
|---|---|---|---|
| Silica | Absolute | CTE | MOR |
| 0.0 wt % | −50 ppm | 0.35 ppm/°C. | 12400 psi |
| Silica added as powder: | | | |

TABLE III-continued

| | Mismatch | | |
|---|---|---|---|
| Silica | Absolute | CTE | MOR |
| 4.0 | −67 | 0.37 | 8100 |
| 8.0 | −61 | 0.29 | 6700 |
| Silica added through grinding: | | | |
| 1.4 | −3 | 0.29 | 9000 |
| 3.5 | −40 | 0.27 | 9200 |
| 5.6 | −33 | 0.083 | 8000 |
| 7.0 | −73 | 0.071 | 9000 |
| Silica added as powder and jet milled: | | | |
| 6.7 | +15 | 0.072 | 11000 |

As the data show, the direct addition of powdered silica had little advantage. However, when incorporated through grinding, average CTE ambient mismatch was reduced by two to three times, while absolute mismatch became greater, and MOR was relatively unaffected. The optimum silica level appeared to be in the range of 5.5 to 7.0 wt%.

It was subsequently found that, if silica powder were added and the mixture jet milled, a satisfactory result could be obtained. However, the material yield is too low from jet milling to be practical, and it is difficult to control the material ratio under those conditions.

Further tests were undertaken to explore the effects of varying the firing cycle used in sintering and crystallizing the frit-silica mixture. A mixture containing 7% by weight SiO2, added through grinding, was used. Test samples were of the sandwich type. A flat piece of pure fused silica was placed between discs pressed from the ground mixture for firing.

TABLE IV shows the results observed. Table headings correspond to those of TABLE II.

TABLE IV

| Sintering | | Mismatch | | |
|---|---|---|---|---|
| Temp. | Time | Absolute | CTE | MOR |
| 975° C. | 4 hrs. | +22 ppm | 0.023 ppm/°C. | 9100 |
| 975 | 1 | +32 | 0.067 | 8980 |
| 950 | 2 | −73 | 0.071 | 8950 |
| 925 | 4 | | FRACTURED | |
| 925 | 1 | | FRACTURED | |

It is apparent that higher firing temperatures are more effective with the pure fused silica combination. Thus, a firing cycle of four hours at 975° C. appears to be most effective.

In summary, the invention provides a means of producing struts for an acceptable network structure to be used as a supporting core for a glass body such as a telescope mirror faceplate. The requirement of average ambient CTE at least below 0.15 ppm/°C. can be met by employing a milled powder mixture of frit glass and the glass body, e.g., the face plate glass, and sintering the mixture with an appropriate firing cycle.

I claim:

1. A composite article comprising a solid glass body and a supporting network structure, the network structure being a plurality of struts composed of sintered and crystallized glass powder and being frit sealed to one another and to the glass body, characterized in that a glass filler in particulate form is dispersed within the sintered struts to provide an average expansion mismatch between the struts and the glass body that does not exceed about 0.15 ppm/°C. over the temperature range of −50° to +50° C.

2. A composite article in accordance with claim 1 wherein the average expansion mismatch does not exceed about 0.10 ppm/°C.

3. A composite article in accordance with claim 1 wherein the parent sinterable and crystallizable glass of the struts is a zinc aluminosilicate having a composition consisting essentially of 1-2% $Li_2O$, 0.7-1.5% MgO, 9-13% ZnO, 19-23% $Al_2O_3$, 62—68% $SiO_2$ and at least 1% of at least one alkali metal oxide selected from the group consisting of $K_2O$, $Cs_2O$ and $Rb_2O$ in the indicated proportions of 0-3% $K_2O$, 0-4% $Rb_2O$ and 0-6% $Cs_2O$.

4. A composite article in accordance with claim 1 wherein the glass filler is fine particles of the solid glass body.

5. A composite article in accordance with claim 4 wherein the solid glass body is composed of a $TiO_2$-doped, fused silica glass.

6. A composite article in accordance with claim 5 wherein the amount of glass particles dispersed in the struts is in the range of 10-22 weight percent.

7. A composite article in accordance with claim 6 wherein the amount of dispersed glass particles is in the range of 12-18 weight percent.

8. A composite article in accordance with claim 6 wherein the amount of dispersed glass particles is about 16 weight percent.

9. A composite article in accordance with claim 6 wherein the glass particles dispersed in the struts additionally include silica particles obtained by grinding with fused silica media.

10. A composite article in accordance with claim 4 wherein the solid glass body is composed of a pure fused silica.

11. A composite article in accordance with claim 10 wherein the pure fused silica particles dispersed in the struts constitute about 4 to 8 weight percent of the materials, and is obtained by grinding with fused silica media.

12. A composite article in accordance with claim 10 wherein the amount of dispersed pure fused silica particles is about 5.5 to 7 weight percent.

13. A composite article in accordance with claim 10 wherein the amount of fused silica particles is about 7 weight percent.

14. A composite article in accordance with claim 1 wherein the solid glass body is the faceplate of a telescope mirror blank.

15. A method of producing a composite article comprising a solid glass body and a supporting network structure, the network structure being composed of a plurality of struts composed of sinterable and crystallizable glass powder and being frit sealed to one another and to the glass body, characterized by forming the struts from a slurry of sinterable, thermally crystallizable glass powder containing dispersed therein particles of the glass body in an amount sufficient to provide an average expansion mismatch between the network structure and the glass body that is no greater than 0.15 ppm/°C. over the temperature range of −50° to +50° C.

16. A method in accordance with claim 15 wherein the solid glass body is composed of a $TiO_2$-doped, fused silica glass.

17. A method in accordance with claim 16 wherein the amount of dispersed glass is in the range of 10 to 22 weight percent.

18. A method in accordance with claim 17 wherein the amount of dispersed glass is in the range of about 12-18 weight percent.

19. A method in accordance with claim 18 wherein the amount of dispersed glass is about 16 weight percent.

20. A method in accordance with claim 15 wherein the solid glass body is composed of a pure fused silica.

21. A method in accordance with claim 20 wherein the amount of dispersed glass is in the range of about 4 to 8 weight percent, and is the result of grinding with fused silica media.

22. A method in accordance with claim 21 wherein the amount of dispersed glass is in the range of about 5.5 to 7 weight percent.

23. A method in accordance with claim 22 wherein the amount of dispersed glass is about 7 weight percent.

24. A method in accordance with claim 15 wherein the total firing cycle for sintering the core network struts and sealing the network to the glass body is one to four hours at a temperature in the range of 925°-975° C.

25. A method in accordance with claim 24 wherein the total firing cycle is two hours at 950° C.

26. A method in accordance with claim 20 wherein the total firing cycle for sintering the network struts and sealing the network to the glass body is one to four hours at a temperature in the range of 950°-975° C.

27. A method in accordance with claim 26 wherein the total firing cycle is four hours at 975° C.

28. A method in accordance with claim 15 wherein the solid glass body is the faceplate of a telescope mirror blank.

* * * * *